(12) United States Patent
Yamauchi

(10) Patent No.: US 8,767,134 B2
(45) Date of Patent: Jul. 1, 2014

(54) PHOTOCONDUCTIVE SWITCHING ELEMENT, PHOTOCONDUCTIVE SWITCHING ELEMENT ARRAY, DISPLAY DEVICE, AND IMAGE FORMING APPARATUS

(75) Inventor: Taisuke Yamauchi, Matsumoto (JP)

(73) Assignee: Seiko Epson Corporation (JP)

( * ) Notice: Subject to any disclaimer, the term of this patent is extended or adjusted under 35 U.S.C. 154(b) by 252 days.

(21) Appl. No.: 13/440,278

(22) Filed: Apr. 5, 2012

(65) Prior Publication Data

US 2012/0257142 A1    Oct. 11, 2012

(30) Foreign Application Priority Data

Apr. 7, 2011   (JP) ................. 2011-085826

(51) Int. Cl.
 *G02F 1/135*   (2006.01)
 *G03G 5/043*   (2006.01)
 *G03G 5/047*   (2006.01)

(52) U.S. Cl.
 CPC .............. *G02F 1/1354* (2013.01); *G03G 5/043* (2013.01); *G03G 5/047* (2013.01)
 USPC .......................................................... 349/25

(58) Field of Classification Search
 CPC ....... G02F 1/1354; G03G 5/043; G03G 5/047
 USPC .......................................................... 349/25
 See application file for complete search history.

(56) References Cited

U.S. PATENT DOCUMENTS

| | | | |
|---|---|---|---|
| 6,600,473 B1* | 7/2003 | Kobayashi et al. | 345/97 |
| 2011/0051024 A1* | 3/2011 | Seki et al. | 349/25 |
| 2011/0085095 A1 | 4/2011 | Yamauchi | |
| 2011/0205456 A1 | 8/2011 | Mizoguchi et al. | |

FOREIGN PATENT DOCUMENTS

| | | |
|---|---|---|
| JP | 2000-180888 | 6/2000 |
| JP | 2011-081245 | 4/2011 |
| JP | 2011-175110 | 9/2011 |

* cited by examiner

*Primary Examiner* — Nathanael R Briggs
(74) *Attorney, Agent, or Firm* — Harness, Dickey & Pierce, P.L.C.

(57) ABSTRACT

A photoconductive switching element includes a first electrode, a second electrode that is arranged so as to face the first electrode, and a photoconductive layer that is arranged between the first electrode and the second electrode and realizes conductivity by receiving light. The photoconductive layer includes a first electric charge generating layer and a second electric charge generating layer that generate electric charge when light is received and an electric charge transport layer which is brought into contact with the first electric charge generating layer and the second electric charge generating layer and to which the electric charge can be moved. The first electric charge generating layer and the second electric charge generating layer are arranged at mutually-different positions in a direction perpendicular to a thickness direction of the electric charge transport layer and at mutually-different positions in the thickness direction of the electric charge transport layer.

20 Claims, 8 Drawing Sheets

PHOTOCONDUCTIVE SWITCHING ELEMENT, PHOTOCONDUCTIVE SWITCHING ELEMENT ARRAY, DISPLAY DEVICE, AND IMAGE FORMING APPARATUS

BACKGROUND

1. Technical Field

The present invention relates to a photoconductive switching element, a photoconductive switching element array, a display device, and an image forming apparatus.

2. Related Art

Generally, optical recording-type image display devices that display desired images are known. As such an optical recording-type image display device, for example, as disclosed in JP-A-2000-180888, there is an optical recording-type image display device that includes a photoconductive switching element and a liquid crystal layer that is stacked on the photoconductive switching element.

The photoconductive switching element disclosed in JP-A-2000-180888 includes: two electrode layers (a first electrode layer and a second electrode layer) to which AC voltages are applied; an upper electric charge generating layer that is arranged on the first electrode layer side between the first electrode layer and the second electrode layer; a lower electric charge generating layer that is arranged on the second electrode layer side between the first electrode layer and the second electrode layer; and an electric charge transport layer that is arranged between the upper electric charge generating layer and the lower electric charge generating layer. The upper electric charge generating layer and the lower electric charge generating layer have a function of generating electric charge when light is received. The electric charge transport layer has a function of transporting electric charge that is generated in the upper electric charge generating layer and the lower electric charge generating layer.

In the photoconductive switching element employing such a configuration, when an AC voltage is applied between the first electrode layer and the second electrode layer, a first state in which a current flows from the first electrode layer toward the second electrode layer or a second state in which a current flows from the second electrode layer toward the first electrode layer is taken. In the first state, a boundary face of the electric charge transport layer and the lower electric charge generating layer appears to act as an energy barrier for a movement of the electric charge, and thus, there are problems in that a current does not reliably flows, and the photoconductive switching element is not driven unless the applied voltage is increased and applied in correspondence with the energy barrier. Similarly, in the second state, a boundary face of the electric charge transport layer and the upper electric charge generating layer appears to act as an energy barrier for a movement of the electric charge, and thus, there are problems in that a current does not reliably flow, and the photoconductive switching element is not driven unless the applied voltage is increased and applied in correspondence with the energy barrier.

SUMMARY

An advantage of some aspects of the invention is that it provides a photoconductive switching element, a photoconductive switching element array, a display device, and an image forming apparatus capable of being driven in an energy saving manner, compared to an existing technique.

An aspect of the invention is directed to a photoconductive switching element including: a first electrode; a second electrode that is arranged so as to face the first electrode; and a photoconductive layer that is arranged between the first electrode and the second electrode and realizes conductivity by receiving light. The photoconductive layer includes: a first electric charge generating layer and a second electric charge generating layer that generate electric charge when light is received; and an electric charge transport layer which is brought into contact with the first electric charge generating layer and the second electric charge generating layer and to which the electric charge generated by the first electric charge generating layer and the second electric charge generating layer can be moved. The first electric charge generating layer and the second electric charge generating layer are arranged at mutually-different positions in a direction perpendicular to a thickness direction of the electric charge transport layer and at mutually-different positions in the thickness direction of the electric charge transport layer.

According to the above-described photoconductive switching element, compared to an existing technique, power saving driving can be performed.

In the above-described photoconductive switching element, it is preferable that the first electric charge generating layer is deviated to the first electrode side, and the second electric charge generating layer is deviated to the second electrode side.

In such a case, in a case where a current flows through the photoconductive layer, when the current flows in the direction from the electric charge transport layer to the electric charge generating layer, the boundary face of the electric charge transport layer and the electric charge generating layer acts as an energy barrier for a movement of the electric charge, and the boundary face of the electrode and the electric charge transport layer acts as an energy barrier for the movement of the electric charge. At this time, by allowing the current to flow through any one electric charge generating layer of the first electric charge generating layer and the second electric charge generating layer, the energy barriers can be avoided. Accordingly, it is unnecessary to increase the voltage up to a level exceeding the energy barrier when the electric charge is moved, and the driving can be performed in a power saving manner.

In the above-described photoconductive switching element, it is preferable that the first electric charge generating layer is brought into contact with the first electrode, or the second electric charge generating layer is brought into contact with the second electrode.

In such a case, in a case where a current flows through the photoconductive layer, when the current flows in the direction from the electric charge transport layer to the electric charge generating layer, the boundary face of the electric charge transport layer and the electric charge generating layer acts as an energy barrier for a movement of the electric charge, and the boundary face of the electrode and the electric charge transport layer acts as an energy barrier for the movement of the electric charge. At this time, by allowing the current to flow through any one electric charge generating layer of the first electric charge generating layer and the second electric charge generating layer, the energy barriers can be avoided. Accordingly, it is unnecessary to increase the voltage up to a level exceeding the energy barrier when the electric charge is moved, and the driving can be performed in a power saving manner.

In the above-described photoconductive switching element, it is preferable that, when a voltage is applied between the first electrode and the second electrode, a current takes a first state in which the current flows through the first electrode, the first electric charge generating layer, the electric charge transport layer, and the second electrode in this order and a second state in which the current flows through the second electrode, the second electric charge generating layer, the electric charge transport layer, and the first electrode in this order.

In such a case, in a case where a current flows through the photoconductive layer, when the current flows in the direction from the electric charge transport layer to the electric charge generating layer, the boundary face of the electric charge transport layer and the electric charge generating layer acts as an energy barrier for a movement of the electric charge, and the boundary face of the electrode and the electric charge transport layer acts as an energy barrier for the movement of the electric charge. At this time, by allowing the current to flow through any one electric charge generating layer of the first electric charge generating layer and the second electric charge generating layer, the energy barriers can be avoided. Accordingly, it is unnecessary to increase the voltage up to a level exceeding the energy barrier when the electric charge is moved, and the driving can be performed in a power saving manner.

In the above-described photoconductive switching element, it is preferable that an area of each of the first electric charge generating layer and the second electric charge generating layer in a plan view in the thickness direction of the electric charge transport layer is smaller than an area of the electric charge transport layer in the plan view.

In such a case, for example, in a case where the photoconductive switching element is used in an image display device having transparency as a display device, the first electric charge generating layer and the second electric charge generating layer are prevented or suppressed from degrading the transparency.

In the above-described photoconductive switching element, it is preferable that a thickness of a portion of the electric charge transport layer in which the first electric charge generating layer is arranged is larger than a thickness of the first electric charge generating layer, and a thickness of a portion of the electric charge transport layer in which the second electric charge generating layer is arranged is larger than a thickness of the second electric charge generating layer.

In such a case, when the photoconductive switching element is manufactured by stacking each layer, the manufacturing process can be performed in an easy manner.

In the above-described photoconductive switching element, it is preferable that the first electric charge generating layer and the second electric charge generating layer are arranged so as to be separated from each other in the plan view.

In such a case, the first electric charge generating layer and the second electric charge generating layer can be separated from each other as far as possible, and, for example, when a current flows from the first electrode side toward the second electrode side, a boundary face of the second electric charge generating layer and the electric charge transport layer can be prevented from being an energy barrier for a movement of the electric charge. In addition, when a current flows from the second electrode side toward the first electrode side, a boundary face of the first electric charge generating layer and the electric charge transport layer can be prevented from being an energy barrier for the movement of the electric charge.

In the above-described photoconductive switching element, it is preferable that a shape of at least one electrode of the first electrode and the second electrode forms a quadrangle in the plan view, and the first electric charge generating layer and the second electric charge generating layer are arranged at positions located on a diagonal of the quadrangle in the plan view.

In such a case, the first electric charge generating layer and the second electric charge generating layer can be separated from each other as far as possible, and, for example, when a current flows from the first electrode side toward the second electrode side, a boundary face of the second electric charge generating layer and the electric charge transport layer can be prevented from being an energy barrier for a movement of the electric charge. In addition, when a current flows from the second electrode side toward the first electrode side, a boundary face of the first electric charge generating layer and the electric charge transport layer can be prevented from being an energy barrier for the movement of the electric charge.

In the above-described photoconductive switching element, it is preferable that at least one of the first electric charge generating layer and the second electric charge generating layer is embedded in the electric charge transport layer.

In such a case, the thickness of the photoconductive switching element can be suppressed.

In the above-described photoconductive switching element, it is preferable that the first electrode and the second electrode have optical transparency.

In such a case, the first electrode and the second electrode can be prevented from disturbing the transparency of the photoconductive switching element, in other words, from lowering the transmittance.

Another aspect of the invention is directed to a photoconductive switching element array including: a plurality of the above-described photoconductive switching elements. The plurality of the photoconductive switching elements are arranged in a matrix pattern in an in-plane direction thereof.

According to the above-described photoconductive switching element array, driving can be performed in a power saving manner.

In the above-described photoconductive switching element array, it is preferable that at least one type of the first electrodes and the second electrodes are connected to each other or integrally formed.

In such a case, when the photoconductive switching element array is manufactured, compared to a case where the electrodes are individually formed, the manufacturing process can be performed in an easy manner.

Still another aspect of the invention is directed to a display device including: at least one photoconductive switching element described above; and a liquid crystal layer that is arranged on the first electrode side or the second electrode side of the photoconductive switching element.

According to the above-described display device, driving can be performed in a power saving manner.

In the above-described display device, it is preferable that the liquid crystal layer can take a light transmitting state in which light is transmitted and a light diffusing state in which light is diffused.

In such a case, a projector screen in which a desired area is set to be in the light scattering state by emitting light thereto can be realized.

Yet another aspect of the invention is directed to an image forming apparatus including: the above-described display device; and a projector that draws an image by emitting light to the display device.

According to the above-described image forming apparatus, driving can be performed in a power saving manner.

BRIEF DESCRIPTION OF THE DRAWINGS

The invention will be described with reference to the accompanying drawings, wherein like numbers reference like elements.

FIG. 1A is a schematic diagram showing a schematic configuration of the image forming apparatus, and FIG. 1B is a diagram showing an example of the use of the image forming apparatus.

DESCRIPTION OF EXEMPLARY EMBODIMENTS

Hereinafter, a photoconductive switching element, a photoconductive switching element array, a display device, and an image forming apparatus according to preferred embodiments of the invention will be described in detail with reference to the accompanying drawings.

First Embodiment

Figure 1A:
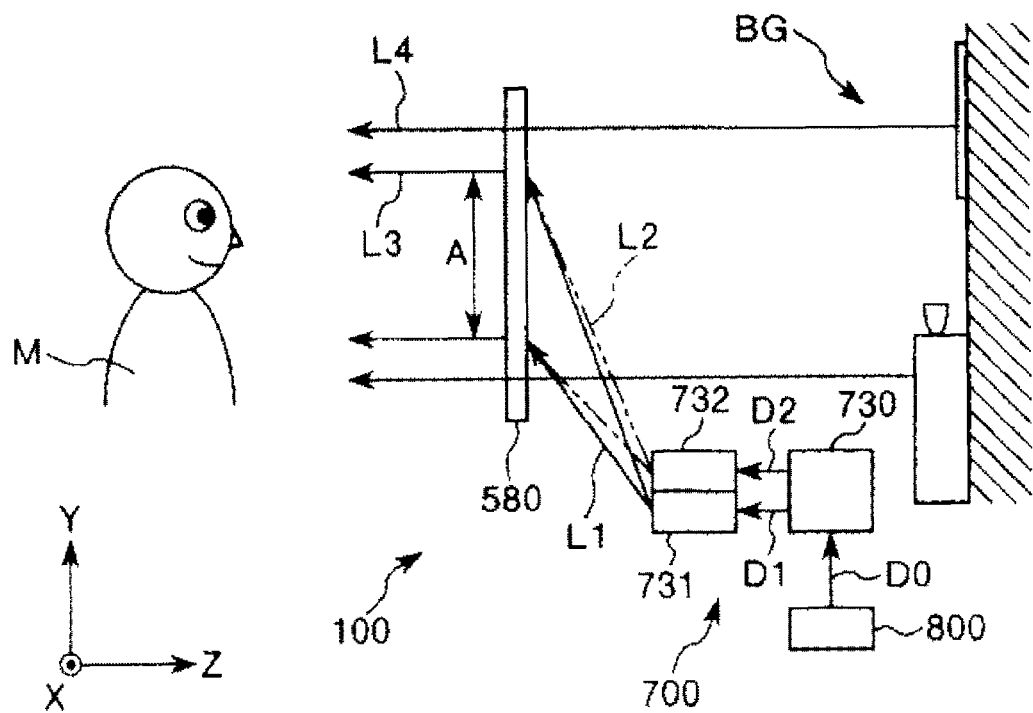
FIGS. 1A and 1B are diagrams showing an image forming apparatus according to a first embodiment of the invention.
Figure 1B:
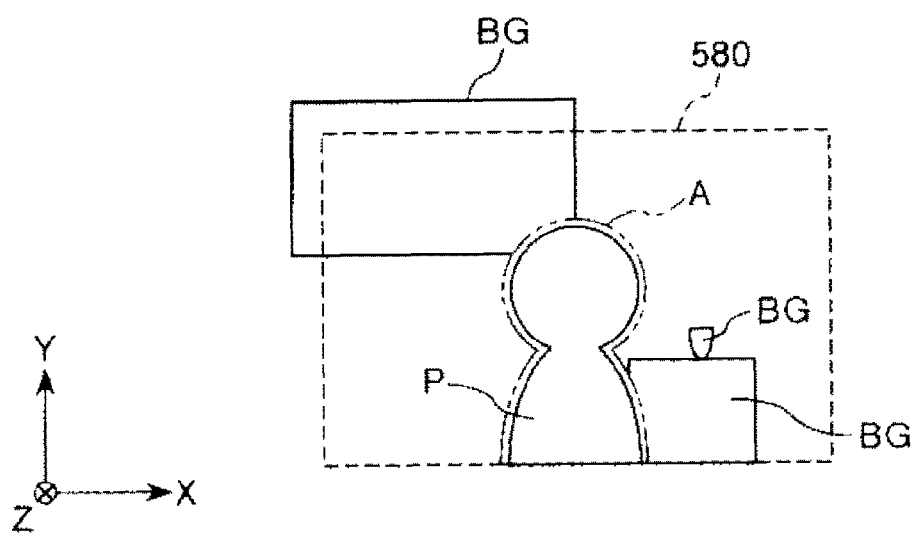
Figure 2:
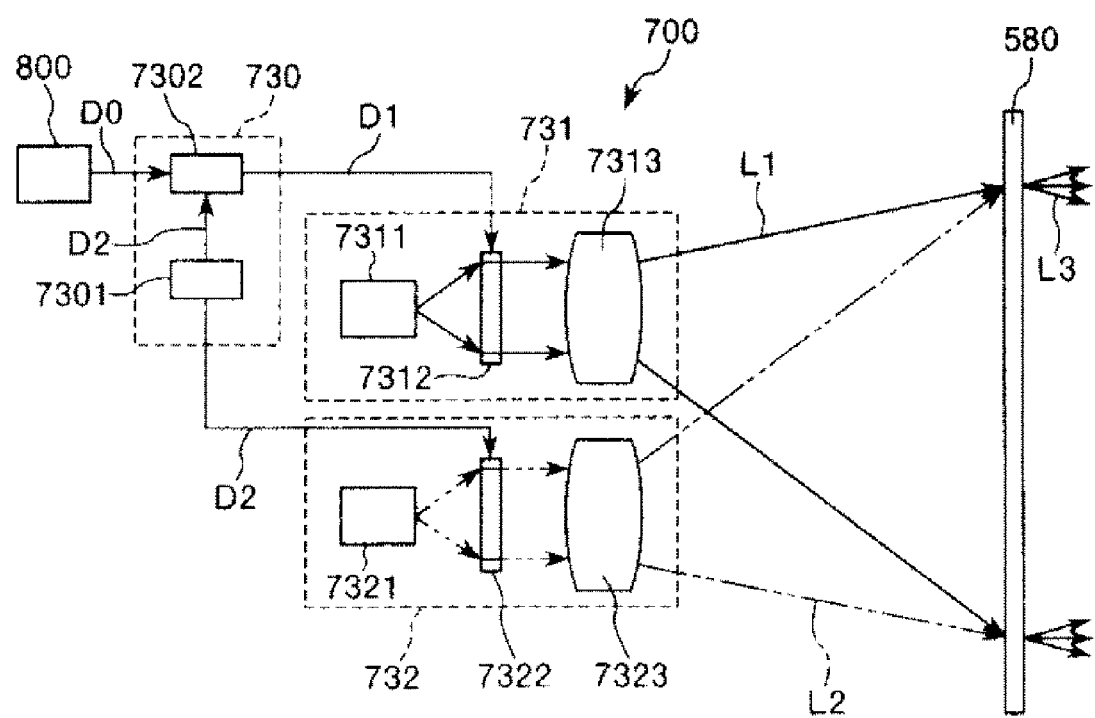
FIG. 2 is a diagram showing a schematic configuration of a projector that is included in the image forming apparatus shown in FIG. 1A.
Figure 3:
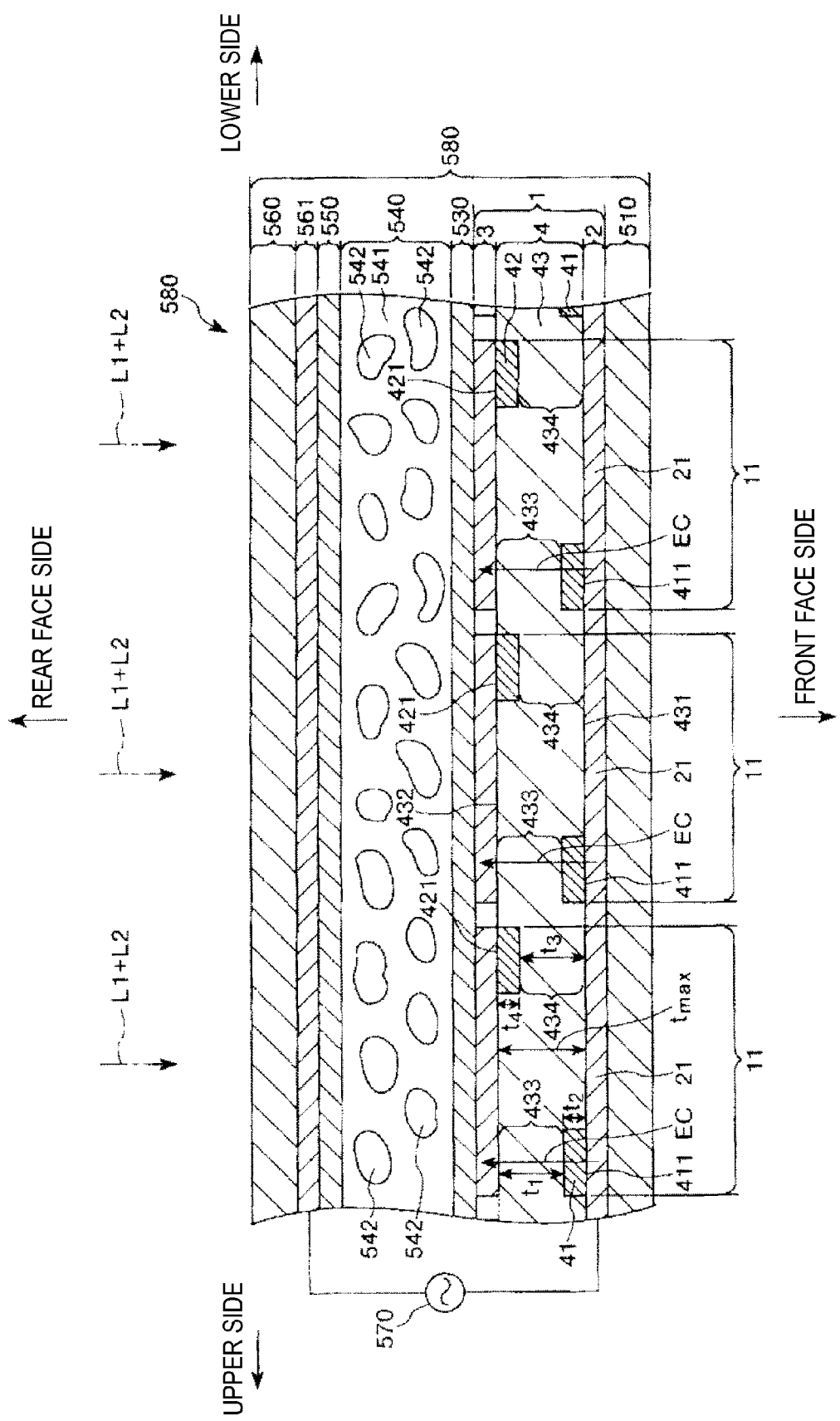
FIG. 3 is a cross-sectional view showing a screen (display device) that is included in the image forming apparatus shown in FIG. 1A.
Figure 4:
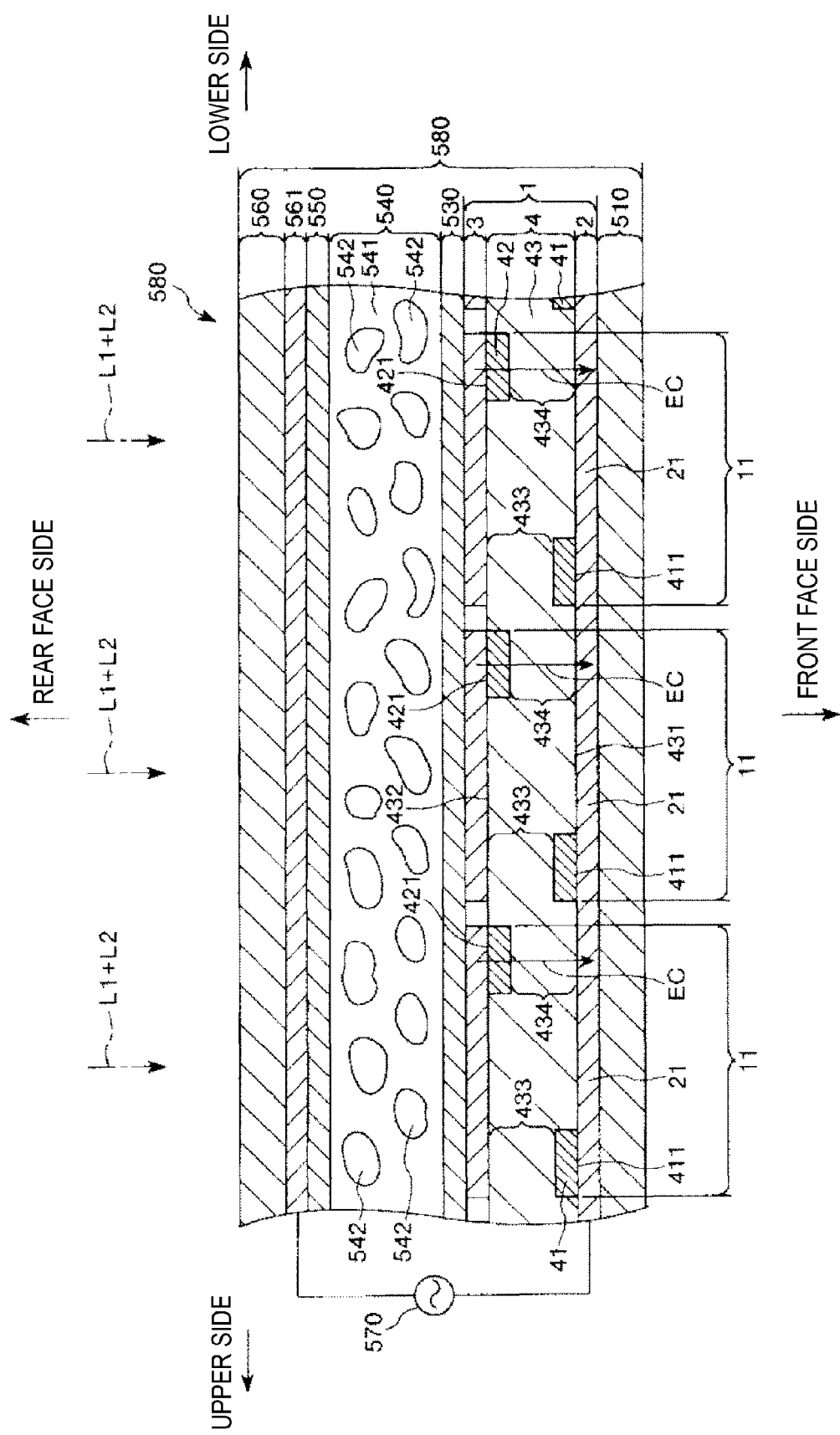
FIG. 4 is a cross-sectional view showing the screen (display device) included in the image forming apparatus shown in FIG. 1A.
Figure 5:
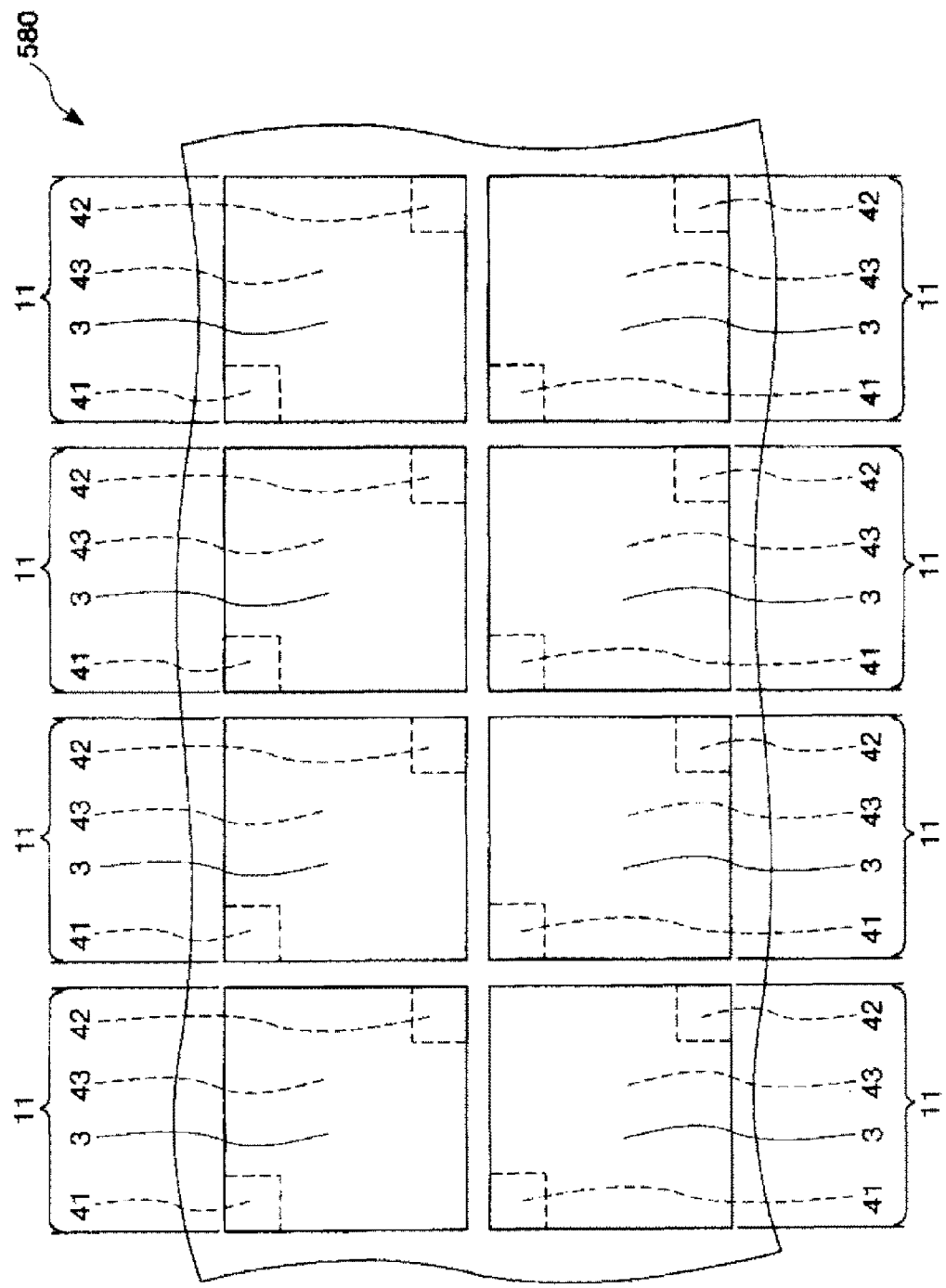
FIG. 5 is a plan view of a photoconductive switching element array that is included in the screen shown in FIG. 3.

FIGS. 1A and 1B are diagrams showing an image forming apparatus according to a first embodiment of the invention. FIG. 1A is a schematic diagram showing a schematic configuration of the image forming apparatus, and FIG. 1B is a diagram showing an example of the use of the image forming apparatus. FIG. 2 is a diagram showing a schematic configuration of a projector that is included in the image forming apparatus shown in FIG. 1A. FIGS. 3 and 4 are cross-sectional views showing a screen (display device) that is included in the image forming apparatus shown in FIG. 1A. FIG. 5 is a plan view of a photoconductive switching element array that is included in the screen shown in FIG. 3. Hereinafter, for convenience of the description, the upper side in FIGS. 1A and 1B is referred to as "up" or "upper side", and the lower side in FIGS. 1A and 1B is referred to as "low" or "lower side". In addition, the lower side in FIGS. 3 and 4 (similarly in FIGS. 6 and 7) is referred to as "front ("front face")" or "front side", and the upper side in FIGS. 3 and 4 are referred to as "rear (rear face)" or "rear side".

As shown in FIGS. 1A and 1B, an image forming apparatus 100 includes a screen 580 and a projector 700. The projector 700 includes a data supplying unit 730, an image projection system 731, and a black-light projection system 732. In addition, the XYZ orthogonal coordinate system shown in FIGS. 1A and 1B, directions following the principal face of the screen 580 is set as the X direction and the Y direction, and the direction of the normal line of the principal face of the screen 580 is set as the Z direction. The X direction and the Z direction, for example, are the horizontal directions, and the Y direction, for example, is the vertical direction.

The image forming apparatus 100 according to the first embodiment operates as below in brief. The screen 580 is configured to be switched between a scattering state (light diffusing state) and a transmitting state (light transmitting state) for visible light in an area to which address light (black light) L2 is incident. The data supplying unit 730 receives input image data D0 for the projector 700 from a signal source 800 such as a personal computer. The data supplying unit 730 outputs image data D1 corresponding to an image P as a part of the input image to the image projection system 731. The data supplying unit 730 outputs range data D2 representing a range of the screen 580 in which the image P is displayed to the black-light projection system 732.

In order to set a display area A on the screen 580 in which the image P is displayed to the scattering state, the black-light projection system 732 projects the address light L2 onto the screen 580 in a pattern corresponding to the display area A. The image projection system 731 forms an image P of visible light based on the image data D1 and projects image light (visible light) L1 corresponding to the image P onto the screen 580.

On the screen 580, the display area A as an area to which the image light L1 is incident is in the scattering state in accordance with the address light L2, and the screen 580 except for the display area A is in the transmitting state. The image light L1 is scattered in the display area A of the screen 580 so as to be scattered light L3, and the scattered light L3 is observed by an observer M, whereby the image P is displayed. In addition, visible light L4 traveling from a background BG located on the opposite side of the observer M with respect to the screen 580 is transmitted through the portion of the screen 580 excluding the display area A of the screen 580 and is observed by the observer M. Accordingly, the image P that is assimilated into the background BG of the actual space is displayed, and therefore, a colorful spatial display can be performed.

Hereinafter, the configurations of the projector 700 and the screen 580 included in the image forming apparatus 100 will be described.

As shown in FIG. 2, the projector 700 includes the data supplying unit 730, the image projection system 731, and the black-light projection system 732. The projector 700 according to this embodiment sets a desired portion of an input image as a partial image and displays the partial image as the image P. The projector 700 is arranged outside the range of the field of vision of the observer M through the screen 580 that is, for example, located on a side of the screen 580 that is opposite to the display side (the observer M) with respect to the screen 580.

The image projection system 731 includes a first light source device 7311, a first optical modulation element 7312, and a first projection optical system 7313. The first light source device 7311 is configured to include a lamp light source, a solid-state light source, or the like and emits light that includes visible light. The first optical modulation element 7312 is configured by a liquid crystal light valve of a transmissive-type or a reflective-type, a digital mirror device (DMD), or the like. The first optical modulation element 7312 modulates light emitted from the first light source device 7311 based on the image data D1 and emits the modulated light as image light L1. The first projection optical system 7313 projects the image light L1 emitted from the first optical modulation element 7312 onto the screen 580.

In fact, the image projection system 731 forms image light of each one of a plurality of color light beams (for example, a red light beam, a green light beam, and a blue light beam), composes the image light of the plurality of color light beams by using a color composing element such as a dichroic prism, and then projects the composed image light by using the first projection optical system 7313. The first optical modulation element is disposed for each one of the plurality of color light beams.

As a specific configuration example of the image projection system 731, there is a configuration in which light emitted from a lamp light source as the first light source device is split into a plurality of color light beams based on the colors and supplies the plurality of color light beams to the first optical modulation element. According to such a configuration, the first optical modulation element is disposed for each color light beam, and a plurality of the first optical modulation elements are disposed for one first light source device.

The black-light projection system 732 includes a second light source device 7321, a second optical modulation element 7322, and a second projection optical system 7323. The second light source device 7321 is configured by a lamp light source, a solid-state light source, or the like and emits light including black light (here, near-infrared light). The second optical modulation element 7322, similarly to the first optical modulation element 7312, is configured by various optical modulation elements. The second optical modulation element 7322 modulates light emitted from the second light source device 7321 based on the range data D2. The incident light is modulated, for example, into two gray scales (binary values of brightness or darkness) for each pixel of the second optical modulation element 7322 so as to be address light L2 having a pattern corresponding to the image P. In other words, the address light L2 is an image of black light, and the contour of this image approximately coincides with the contour of the image P.

The second projection optical system 7323 projects the address light L2 emitted from the second optical modulation element 7322 so as to overlap the image light L1 on the screen 580. In the second projection optical system 7323 according to this embodiment, the focus and the zoom are controlled in cooperating with the first projection optical system 7313. Accordingly, it is possible to allow an area (hereinafter, referred to as an IR incidence area) onto which the address light L2 is projected to be in correspondence with the display area A on the screen 580 with high precision.

The data supplying unit 730 includes a display range setting section 7301 and an image extracting section 7302. The display range setting section 7301 outputs the range data D2 to the image extracting section 7302 and the second optical modulation element 7322, which represents a range (the range of a partial image) to be displayed out of the input image. The range of the partial image, for example, is set based on a user's input. The image extracting section 7302 maintains the gray scale values of pixels of the input image data D0 that configure the image P and updates the gray scale values of pixels other than the pixels of the image P with a blank (for example, black), thereby generating the image data D1. The image extracting section 7302 outputs the image data D1 to the first optical modulation element 7312.

The screen 580 is supported, for example, by a stage (not shown in the figure) in a standing state. When the image P is not displayed, the screen 580 is in a colorless and transparent or bluish (in this embodiment, representatively, it is assumed to be "colorless transparent") transmitting state, and, like a transparent glass plate, the rear side thereof can be visually recognized. On the other hand, when the image P is displayed (drawn) on the screen 580 by the projector 700, a state is formed in which only an area of the screen 580 in which the image P is displayed is in a white-colored state (scattering state), and, by projecting the image light L1 onto the white-colored area from the projector 700, a desired image is displayed on the screen 580. At this time, an area in which the image P is not displayed is maintained to be in the transmitting state. Thus, according to the image forming apparatus 100 employing such a configuration, first, there is an advantage that the screen 580 does not disturb the vision when the screen is not used (when an image P is not displayed). Second, when the screen is used (when the image P is displayed), the image P is displayed on the transparent plate with excellent visibility, and accordingly, a feeling of the image being floated can be given to the observer M, whereby an interest in the displayed image can be effectively caused. In other words, according to the image forming apparatus 100, for example, a superior advertising effect can be provided.

In addition, in this embodiment, the projector 700 is disposed near the screen 580, in other words, the lower rear side of the screen 580 and is configured to display an image through proximity projection for the screen 580. In addition, the projector 700 is disposed within 1 m from a portion of the screen 580 that is closest to the projector 700. As above, by disposing the projector 700 near the screen 580, the image light L1 projected from the projector 700 can be effectively prevented from being blocked off by an obstacle such as another exhibit, whereby a desired image can be displayed more reliably on the screen 580.

In the screen 580 having such an arrangement, a first substrate 510, a photoconductive switching element array 1 (photoconductive switching element aggregation) having a first common electrode (first electrode) 2, an oriented film 530, a liquid crystal polymer composite layer (liquid crystal layer) 540, an oriented film 550, a second common electrode 561, and a second substrate 560 are stacked in the mentioned order from the front face side (see FIGS. 3 and 4). In addition, the photoconductive switching element array 1 includes a multiple individual electrodes (second electrodes) 3 arranged so as to face the first common electrode 2 and a photoconductive layer 4 that is arranged between the first common electrode 2 and the individual electrodes 3 and shows conductivity by receiving the address light L2, in addition to the first common electrode 2. Here, the first common electrode 2 and the second common electrode 561 are respectively electrically connected to a voltage applying unit 570. A voltage can be applied between the first common electrode 2 and the second common electrode 561 by this voltage applying unit 570.

By employing such a configuration, the screen 580 that can be switched between the transmitting state and the scattering state described above can be acquired easily.

In addition, as shown in FIGS. 3 to 5, the photoconductive switching element array 1 can be divided into multiple (a plurality of) photoconductive switching elements 11 for the individual electrode 3. In other words, the photoconductive switching element array 1 is acquired by connecting (aggregating) multiple photoconductive switching elements 11 arranged in a matrix pattern in the facial direction thereof. Accordingly, each photoconductive switching element 11 can be independently driven.

The first substrate 510 and the second substrate 560 are respectively configured by sheet-shaped (flat plate-shaped)

members and have a function of supporting and protecting each member arranged therebetween. In addition, the first substrate 510 and the second substrate 560 have optical transparency and are substantially colorless and transparent. Furthermore, the first substrate 510 and the second substrate 560 may have flexibility or hardness.

The composition materials of the first substrate 510 and the second substrate 560 are not particularly limited, and, for example, polymer films such as glass, polyester (polyethylene terephthalate), polysulfone, polyethersulfone, and polycarbonate can be used.

On the rear face of the first substrate 510, a film-shaped first common electrode 2 is formed. The film-shaped individual electrodes 3 are formed so as to face the first common electrode 2. In addition, on the front face of the second substrate 560, the second common electrode 561 is formed.

The first common electrode 2, the individual electrodes 3, and the second common electrode 561 have optical transparency and are substantially colorless and transparent. Accordingly, each electrode is prevented from disturbing the transparency of the screen 580, in other words, from lowering the transmittance.

Here, since the first common electrode 2 and the second common electrode 561 are respectively electrically connected to the voltage applying unit 570, a voltage can be applied between the first common electrode 2 and the second common electrode 561 by the voltage applying unit 570. At this time, when the photoconductive layer 4 has a low resistance component, there is an electric potential difference between the first common electrode 2 and each individual electrode 3, in other words, a voltage drop occurs in the photoconductive layer 4. Accordingly, an electric field is generated between the first common electrode 2 and each individual electrode 3, and the generated electric field acts on the photoconductive layer 4. In addition, an electric field is also generated between each individual electrode 3 and the second common electrode 561, and the generated electric field acts on the liquid crystal polymer composite layer 540.

The composition materials of the first common electrode 2, the individual electrodes 3, and the second common electrode 561 are not particularly limited, as long as the materials have substantial conductivity and are substantially colorless and transparent. Examples of the composition materials are various conductive materials including a metal material such as gold, silver, copper, aluminum, or an alloy containing such a metal material, a carbon-based material such as carbon black, an electronic conductive polymer material such as polyacetylene, polyfluorene, or derivatives thereof, an ionic conductive polymer material acquired by dispersing an ionic material such as NaCl, $Cu(CF_3SO_3)_2$, or the like in matrix resin such as polyvinyl alcohol or polycarbonate, a conductive oxide material such as indium oxide (IO), indium tin oxide (ITO), fluorine-doped tin oxide (FTO), and the like, and one kind or two or more kinds of such materials may be combined and used.

Between the first common electrode 2 and the individual electrodes 3, the photoconductive layer 4 is arranged. The configuration of the photoconductive layer 4 will be described later.

Between the individual electrodes 3 and the second common electrode 561, the liquid crystal polymer composite layer 540 is arranged. The liquid crystal polymer composite layer 540 is in a state in which particles of a polymer 542 are dispersed in a liquid crystal 541 so as to be phase-separated (see FIGS. 3 and 4). Here, in the liquid crystal polymer composite layer 540 of this embodiment, although the particles of the polymer 542 are dispersed in the liquid crystal 541, in contrast to this, particles of the liquid crystal 541 may be dispersed in the polymer 542.

As the polymer 542, a polymer is used that is compatible with the liquid crystal 541 in a liquid crystal phase state, and thereafter, when it is hardened, the phase thereof is separated from that of the liquid crystal 541. As such a polymer 542, for example, a polymer acquired by attaching a side chain having a benzene framework or a biphenyl framework to a polymer backbone can be broadly used regardless whether it is a thermoplastic polymer, a thermosetting polymer, or an ultraviolet-curing polymer.

On the other hand, as the liquid crystal 541, for example, a liquid crystal that is oriented in a direction parallel to the direction of the electric field and has positive dielectric anisotropy is used. As such a liquid crystal 541, for example, phenylcyclohexane derivative liquid crystal, biphenyl derivative liquid crystal, biphenylclohexane derivative liquid crystal, terphenyl derivative liquid crystal, phenylether derivative liquid crystal, phenylester derivative liquid crystal, bicyclohexane derivative liquid crystal, azometin derivative liquid crystal, azoxy derivative liquid crystal, pyrimidine derivative liquid crystal, dioxane derivative liquid crystal, and cubane derivative liquid crystal, and the like can be used. In addition, as the liquid crystal 541, in order to improve the contrast of the screen 580, it is preferable to use a liquid crystal having a refractive index anisotropy as high as possible.

On both faces of the liquid crystal polymer composite layer 540, the oriented films 530 and 550 are formed. For the oriented films 530 and 550, an orientation process is performed for allowing the liquid crystal 541 and the polymer 542 included in the liquid crystal polymer composite layer 540 to be oriented in a direction parallel to the first substrate 510 and the second substrate 560. Although the polymer 542 is in the liquid crystal phase when it is oriented, thereafter, it is hardened, and accordingly, the polymer 542 is fixed in the state in which the oriented state is maintained. Accordingly, thereafter, even when an electric field is applied to the polymer 542, the oriented direction thereof does not match the direction of the electric field. On the other hand, since the oriented state of the liquid crystal 541 is not fixed, when an electric field is applied thereto, the orientated direction of the liquid crystal 541 matches the direction of the electric field.

Thus, in a case where an electric field is not applied to the liquid crystal polymer composite layer 540, the oriented directions of the polymer 542 and the liquid crystal 541 are in the state of coinciding with a direction parallel to the first substrate 510 and the second substrate 560 (the liquid crystal 541 and the polymer 542 are uniformly oriented). In this state, by allowing the refractive indices of the two to coincide with each other, the screen 580 is in a transparent state (transmitting state).

In contrast to this, when an electric field is applied to the liquid crystal polymer composite layer 540, the oriented direction of the liquid crystal 541 matches the direction of the electric field (a state is formed in which the liquid crystal 541 and the polymer 542 are oriented in mutually different directions). Accordingly, in the direction of the electric field, a light scattering state is formed due to mismatching of the refractive indices of the liquid crystal 541 and the polymer 542 on the boundary face, whereby the screen 580 is in the white state (scattering state).

According to such a liquid crystal polymer composite layer 540, when a voltage is not applied to the liquid crystal polymer composite layer 540, a colorless and transparent transmitting state is formed, and, by applying a voltage thereto, a white-colored scattering state can be formed, whereby the screen 580 that is appropriate for the use of the image forming apparatus 100 can be acquired. In addition, the switching between the transmitting state and the scattering state can be performed independently for each portion of the screen 580, in other words, for each photoconductive switching element 11.

The switching between the transmitting state and the scattering state will be described in detail.

The polymer 542 and the liquid crystal 541 represent similar refractive index anisotropy, have a refractive index of about 1.5 in a direction parallel to the oriented direction, and have a refractive index of about 1.7 in a direction perpendicular to the oriented direction. In a state in which an electric field is not applied to the liquid crystal polymer composite layer 540, the liquid crystal 541 and the polymer 542 are oriented in the same direction, and accordingly, the refractive indices of the liquid crystal 541 and the polymer 542 coincide with each other in a direction perpendicular to the first substrate 510 and the second substrate 560. Accordingly, in this state, the screen 580 is in a substantially colorless and transparent state (transmitting state) having transmittance of about 80%.

On the other hand, under a condition in which a voltage is applied between the first common electrode 2 and the second common electrode 561 by the voltage applying unit 570, and an electric field acts on the liquid crystal polymer composite layer 540, while the oriented direction of the polymer 542 is unchanged, only the liquid crystal 541 is oriented in the direction of the electric field, in other words, in the direction perpendicular to the first substrate 510 and the second substrate 560. Accordingly, in the direction of the electric field perpendicular to the first substrate 510 and the second substrate 560, while the refractive index of the polymer 542 is maintained to be about 1.7, the refractive index of the liquid crystal 541 changes to about 1.5. Therefore, a difference between the refractive index of the polymer 542 and the refractive index of the liquid crystal 541 in the direction of the electric field is about 0.2, and light incident in the direction perpendicular to the first substrate 510 and the second substrate 560 is scattered. As a result, in this state, the screen 580 is in the state (scattering state) of being colored white in the direction of the electric field.

Hereinafter, a method of using the screen 580 employing the above-described configuration will be described.

First, an AC voltage having a predetermined magnitude is applied in advance between the first common electrode 2 and the second common electrode 561 by the voltage applying unit 570 (hereinafter, this state is also referred to as a "standby state"). The magnitude of the voltage applied in the standby state is a magnitude for which the screen 580 maintains high transmittance, for example, of about 80% and maintains a substantially colorless and transparent state. Then, by slightly increasing the voltage applied to the liquid crystal polymer composite layer 540 from the standby state, the screen 580 can be changed to be in the scattering state.

In addition, the address light L2 is emitted from the projector 700 to a desired portion (microscopic area) of the screen 580 that is in the standby state. Then, the electrical resistance of the photoconductive layer 4 decreases in the portion to which the address light L2 is emitted due to the emission of the address light L2, whereby an actual voltage applied to the liquid crystal polymer composite layer 540 increases. Accordingly, the transmittance of the portion decreases and is colored white so as to be in the scattering state. On the other hand, the voltage level applied to the liquid crystal polymer composite layer 540 does not change in a portion to which the address light L2 is not emitted, and accordingly, the portion is maintained to be in the colorless and transparent state. The portion that is in the white-colored state can be used as an area corresponding to the image P to be displayed on the screen 580, in other words, an area in which the image P is displayed.

Although the light amount of the address light L2 emitted onto the screen 580 is not particularly limited as long as the address light can decrease the transmittance of the portion to which the address light L2 is emitted, the light amount is preferable for which the transmittance of the screen 580 is equal to or less than 20%, and the light amount is more preferable for which the transmittance of the screen 580 is equal to or less than 5%.

As above, the screen 580 is colorless and transparent in the standby state, and only the area in which the image P is displayed is used in the scattering state. Accordingly, for example, it can be said that the screen 580 is a digital signage (electronic signboard) having a superior advertisement effect as described above.

However, as described above, the photoconductive layer 4 is arranged between the first common electrode 2 and the individual electrodes 3. This photoconductive layer 4 has optical transparency and is substantially colorless and transparent. In addition, when the address light L2 is emitted to the photoconductive layer 4, the impedance changes in accordance with the light amount thereof.

As shown in FIGS. 3 to 5, in each photoconductive switching element 11 divided for each individual electrode 3, the photoconductive layer 4 is configured by a first electric charge generating layer 41, a second electric charge generating layer 42, and an electric charge transport layer 43. Since the configurations of the photoconductive switching elements 11 are the same, hereinafter, only one photoconductive switching element 11 will be representatively described.

It is preferable that the photoconductive switching element 11, for example, is formed in a square shape having a size of one side in the range of 0.5 to 10 mm in the plan view, and it is more preferable that the photoconductive switching element 11 is formed in a square shape having a size of one side in the range of 0.5 to 1 mm.

The first electric charge generating layer 41 has a function of generating electric charge when receiving the address light L2. Similarly, the second electric charge generating layer 42 has a function of generating electric charge when receiving the address light L2. Each of the first electric charge generating layer 41 and the second electric charge generating layer 42 is configured by forming an electric charge generating material as a film, for example, by using a deposition method, a sputtering method, an ion plating method, a CVD method, or the like, dispersing the electric charge generating material in a resin binder, and performing coating using a bar coating method, a spin coating method, a roll coating method, a dip method, a casting method, or the like. As the electric charge generating material, a p-type organic semiconductor material can be used, and, for example, an organic material such as phthalocyanine series, azo series, polycyclic quinone series, indigo series, quinacridone series, perylene series, squarylium series, azulenium series, a cyanine series, or pyrylium series can be used. In addition, the resin binder is not particularly limited, and, for example, a polycarbonate, polyarylate, polyethylene, polypropylene, polyester, polyvinylacetate, polyvinyl butyral, acryl, methacryle, vinyl chloride, vinyl acetate, or a copolymer thereof can be used.

The electric charge transport layer 43 has a function of transporting electric charge (the moving charge) generated in the first electric charge generating layer 41 or the second electric charge generating layer 42. The electric charge transport layer 43, for example, is configured by dispersing an electric charge transport material in a resin binder and performing coating using a bar coating method, a spin coating method, a roll coating method, a dip method, a casting method, or the like. As the electric charge transport material, in a case where a p-type organic semiconductor is used in the electric charge generating material, a hole transport material having an electron-donating property is used, and, for example, an organic material such as carbazole series, triazole series, oxadiazole series, imidazole series, pyrazorine series, hydrazine series, stilbene series, amine series, or nitrofluorenones series can be used. In addition, as the resin binder, for example, a polycarbonate, polyarylate, polyethylene, polypropylene, polyester, polyvinylacetate, polyvinyl butyral, acryl, methacryle, vinyl chloride, vinyl acetate, or a copolymer thereof can be used.

In the photoconductive switching element 11 including the first electric charge generating layer 41, the second electric charge generating layer 42, and the electric charge transport layer 43, the first electric charge generating layer 41 and the second electric charge generating layer 42 are arranged at mutually different positions in a direction (so-called an in-plane direction of the electric charge transport layer 43) perpendicular to the thickness direction of the electric charge transport layer 43. In other words, the first electric charge generating layer 41 and the second electric charge generating layer 42 are arranged so as to be deviated (separated) from each other in the horizontal direction in FIGS. 3 to 5. In particular, as shown in FIG. 5, the individual electrode 3 forms a square in the plan view viewed in the thickness direction of the electric charge transport layer 43, and the first electric charge generating layer 41 and the second electric charge generating layer 42 are arranged on the diagonal thereof. Here, the thickness direction of the electric charge transport layer 43 is a direction (the direction of the normal line of a front face 431 or a rear face 432) in which the inter-facial distance between the front face 431 and the rear face 432 is minimal. Accordingly, the first electric charge generating layer 41 and the second electric charge generating layer 42 can be separated from each other as far as possible, and, for example, as will be described later, when a current EC flows from the first common electrode side toward the individual electrode 3 side (see FIG. 3), a boundary face of the second electric charge generating layer 42 and the electric charge transport layer 43 can be prevented from being an energy barrier for a movement of electric charge. In addition, when the current EC flows from the individual electrode 3 side toward the first common electrode side (see FIG. 4), the boundary face of the first electric charge generating layer 42 and the electric charge transport layer 43 can be prevented from being an energy barrier for the movement of the electric charge.

In addition, it is preferable that a separation distance between the first electric charge generating layer 41 and the second electric charge generating layer 42, for example, is equal to or larger than the maximum thickness $t_{max}$ of the electric charge transport layer 43.

Furthermore, although the shapes of the first electric charge generating layer 41 and the second electric charge generating layer 42 in the plan view are squares in the configuration shown in FIG. 5, the shapes are not limited thereto but, for example, may be rectangular shapes, circular shapes, oval shapes, fan shapes, or the like.

In addition, the first electric charge generating layer 41 and the second electric charge generating layer 42 are arranged at mutually different positions also in the thickness direction of the electric charge transport layer 43. In other words, the first electric charge generating layer 41 and the second electric charge generating layer 42 are arranged so as to be deviated from each other also in the vertical direction in FIGS. 3 and 4. In particular, as shown in FIGS. 3 and 4, the first electric charge generating layer 41 is deviated to the first common electrode 2 side. The deviation of the first electric charge generating layer 41 to the first common electrode 2 side means that the first electric charge generating layer 41 is geometrically deviated such that the first electric charge generating layer 41 is located at a position closer to the first common electrode 2 than the individual electrode 3. In such a case, particularly, it is preferable that the first electric charge generating layer 41 is brought into contact with the first common electrode 2. On the other hand, the second electric charge generating layer 42 is deviated to the individual electrode 3 side. The deviation of the second electric charge generating layer 42 to the individual electrode 3 side means that the second electric charge generating layer 42 is geometrically deviated such that the second electric charge generating layer 42 is located at a position closer to the individual electrode 3 than the first common electrode 2. In such a case, particularly, it is preferable that the second electric charge generating layer 42 is brought into contact with the individual electrode 3.

In addition, the first electric charge generating layer 41 and the second electric charge generating layer 42 are wholly embedded in the electric charge transport layer 43. In other words, a front face 411 of the first electric charge generating layer 41 is located on the same plane as that of the front face 431 of the electric charge transport layer 43, and a rear face 421 of the second electric charge generating layer 42 is located on the same plane as that of rear face 432 of the electric charge transport layer 43.

In the photoconductive switching element 11, the first electric charge generating layer 41, the second electric charge generating layer 42, and the electric charge transport layer 43 are arranged so as to have the above-described positional relationship.

When an AC voltage is applied between the first common electrode 2 and the second common electrode 3, there are a case where the current EC flowing inside the photoconductive layer 4 of the photoconductive switching element 11 flows from the first common electrode 2 side toward the second common electrode 3 side (see FIG. 3) and a case contrary thereto where the current EC flows from the second common electrode 3 side toward the first common electrode 2 side (see FIG. 4).

Here, a case will be considered in which one electric charge generating layer (for example, the first electric charge generating layer 41) of the first electric charge generating layer 41 and the second electric charge generating layer 42 is omitted. In such a case, in the state shown in FIG. 4, when a negative bias is applied to the first common electrode 2 with respect to the second common electrode 561, in a case where the address light L2 is projected to the photoconductive layer 4, electric charge is generated in the second electric charge generating layer 42, and the current EC is generated in the direction of the arrows shown in FIG. 4, and the photoconductive layer 4 becomes a low-resistance component. In contrast to this, when a positive bias is applied to the first common electrode 2 with respect to the second common electrode 561, in a case where the address light L2 is projected to the photoconductive layer 4, while electric charge is generated in the second electric charge generating layer 42, and the current EC tends to be generated in the direction of the arrows shown in FIG. 3, at this time, the boundary face of the second electric charge generating layer 42 and the electric charge transport layer 43 and the periphery thereof act as an energy barrier for the electric charge, and the boundary face of the first common electrode 2 and the electric charge transport layer 43 acts as an energy barrier for a movement of the electric charge. Accordingly, in order to allow the current EC to reliably flow in the direction of the arrows shown in FIG. 3, the voltage needs to be increased up to a level exceeding the energy barrier and applied.

In contrast to this, in the photoconductive switching element 11, both the first electric charge generating layer 41 and the second electric charge generating layer 42 are disposed on the photoconductive layer 4. Accordingly, as shown in FIG. 3, the current EC does not pass through the second electric charge generating layer 42 and can flow with high priority through the first common electrode 2, the first electric charge generating layer 41, a first electric charge generating layer arranging unit 433 (electric charge transport layer 43) and the individual electrode 3 in the mentioned order (first state). In addition, since an AC voltage is applied between the first common electrode 2 and the second common electrode 3, a state opposite to the first state is formed, in other words, the current EC can flow through the individual electrode 3, the second electric charge generating layer 42, a second electric charge generating layer arranging unit 434 (electric charge transport layer 43) and the first common electrode 2 with high priority in the mentioned order without passing through the first electric charge generating layer 41 (second state).

As above, since the photoconductive switching element 11 can take the first state or the second state, the photoconductive layer 4 can be configured as a low-resistance component without increasing the voltage up to a level exceeding the above-described energy barrier. Accordingly, a driving voltage for which the transmittance of the screen 580 has a minimum value can be decreased as much as possible. In other words, the driving of the screen 580 can be performed in a power saving manner.

As shown in FIG. 5, in the photoconductive switching element 11, the area of each of the first electric charge generating layer 41 and the second electric charge generating layer 42 in the plan view in the thickness direction of the electric charge transport layer 43 is smaller than the area of the electric charge transport layer 43 in the plan view in the thickness direction of the electric charge transport layer 43. The sum of the areas of the first electric charge generating layer 41 and the second electric charge generating layer 42, for example, is preferably equal to or less than 50% of the area of the electric charge transport layer 43, is more preferably in the range of 0.1 to 20%, and is furthermore preferably in the range of 0.1 to 1%.

Although the first electric charge generating layer 41 and the second electric charge generating layer 42 respectively have relatively low optical transparency, by setting the sum of the areas of the first electric charge generating layer 41 and the second electric charge generating layer 42 in the above-described numeric range, a decrease in the transparency as the whole screen 580 can be prevented or suppressed.

In addition, by appropriately setting the sizes of the areas of the first electric charge generating layer 41 and the second electric charge generating layer 42, the impedance of the photoconductive layer 4 can be changed, and the degree of freedom of the design of the first electric charge generating layer 41 and the second electric charge generating layer 42 in a case where desired impedance is to be set is increased.

As shown in FIG. 3 (similarly in FIG. 4), in the photoconductive switching element 11, the thickness $t_1$ of a portion (first electric charge generating layer arranging unit 433) of the electric charge transport layer 43 at which the first electric charge generating layer 41 is arranged is larger than the thickness $t_2$ of the first electric charge generating layer 41. In addition, the thickness $t_3$ of a portion (second electric charge generating layer arranging unit 434) of the electric charge transport layer 43 at which the second electric charge generating layer of the electric charge transport layer 43 is arranged is larger than the thickness $t_4$ of the second electric charge generating layer.

According to the magnitude relationship of the thicknesses of the layers, when the photoconductive switching element array 1 (the photoconductive switching element 11) is manufactured by stacking each layer, the manufacturing process can be performed in an easy manner.

In addition, the thickness $t_1$ and the thickness $t_3$ are the same, and the thickness $t_2$ and the thickness $t_4$ are the same.

In addition, as shown in FIGS. 3 and 4, in the photoconductive switching element array 1, the first common electrode 2 is formed over each photoconductive switching element 11. In other words, when portions of the first common electrode 2 that face each individual electrode 3 are referred to as "first electrodes 21", the first electrodes 21 can be regarded to be connected together or integrally formed. By employing such a configuration, compared to a case where the first electrodes 21 are arranged in correspondence with the individual electrodes 3, the configuration of the photoconductive switching element array 1 can be simplified, and the electrodes corresponding to each individual electrode 3 can be formed together, whereby the manufacturing process of the photoconductive switching element array 1 can be performed in an easy manner.

Second Embodiment

Figure 6:
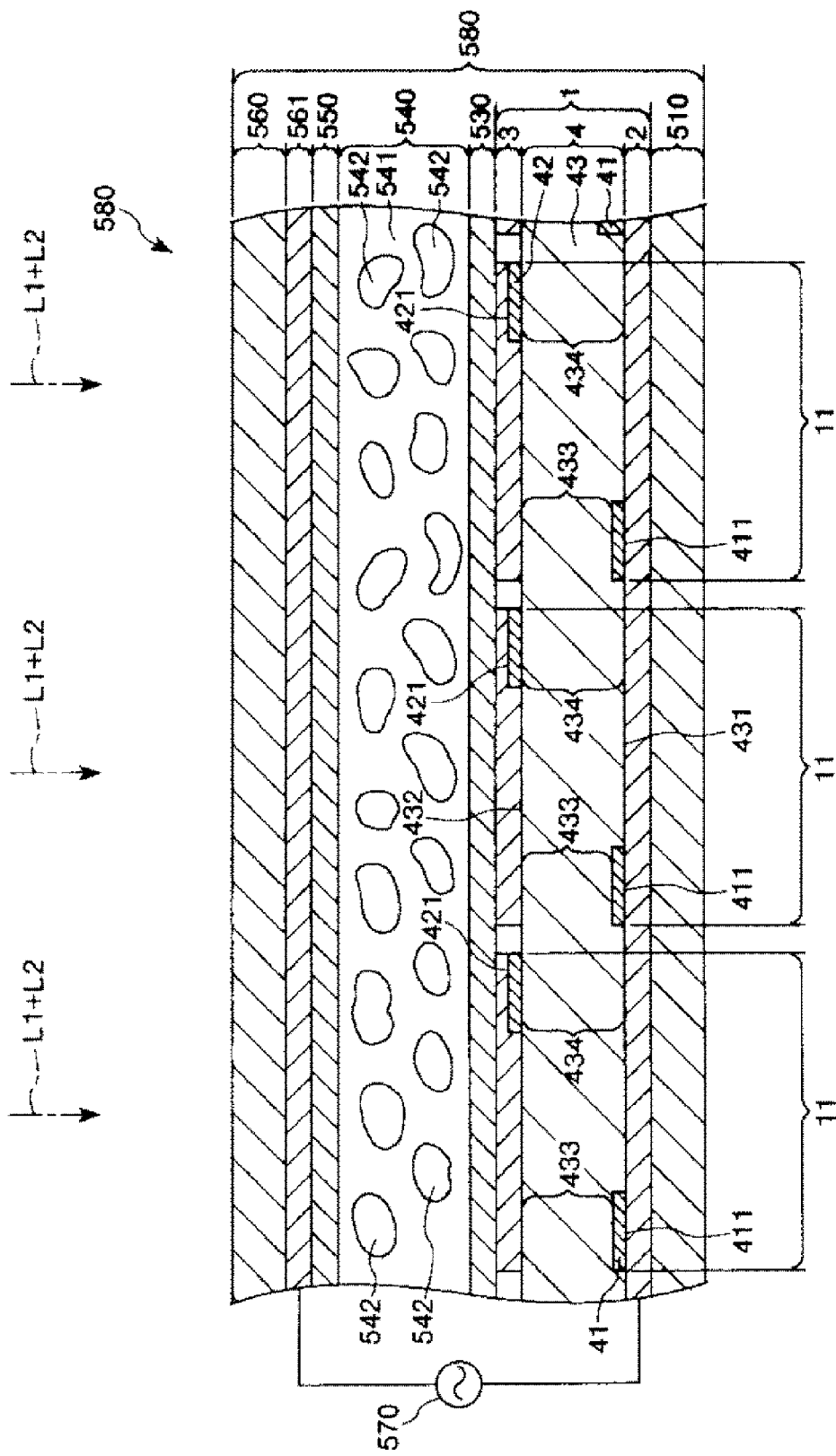
FIG. 6 is a cross-sectional view showing a screen (display device) that is included in an image forming apparatus according to a second embodiment of the invention.

FIG. 6 is a cross-sectional view showing a screen (display device) that is included in an image forming apparatus according to a second embodiment of the invention.

Hereinafter, a photoconductive switching element, a photoconductive switching element array, a display device, and an image forming apparatus according to the second embodiment will be described with reference to the drawings. Differences from the above-described embodiment will be focused upon, and the description of similar matters will not be presented here.

This embodiment is the same as the above-described first embodiment except for the arrangement position of the second electric charge generating layer.

As shown in FIG. 6, in the photoconductive switching element 11 according to this embodiment, the second electric charge generating layer 42 is embedded in the individual electrodes 3. In other words, the second electric charge generating layer 42 protrudes from the electric charge transport layer 43. Accordingly, when the photoconductive switching element array 1 is manufactured, film formation can be performed by sequentially stacking the first common electrode 2, the first electric charge generating layer 41, the electric charge transport layer 43, the second electric charge generating layer 42, and the individual electrodes 3, for example, through screen printing, whereby the manufacturing process can be performed in an easy manner.

Third Embodiment

Figure 7:
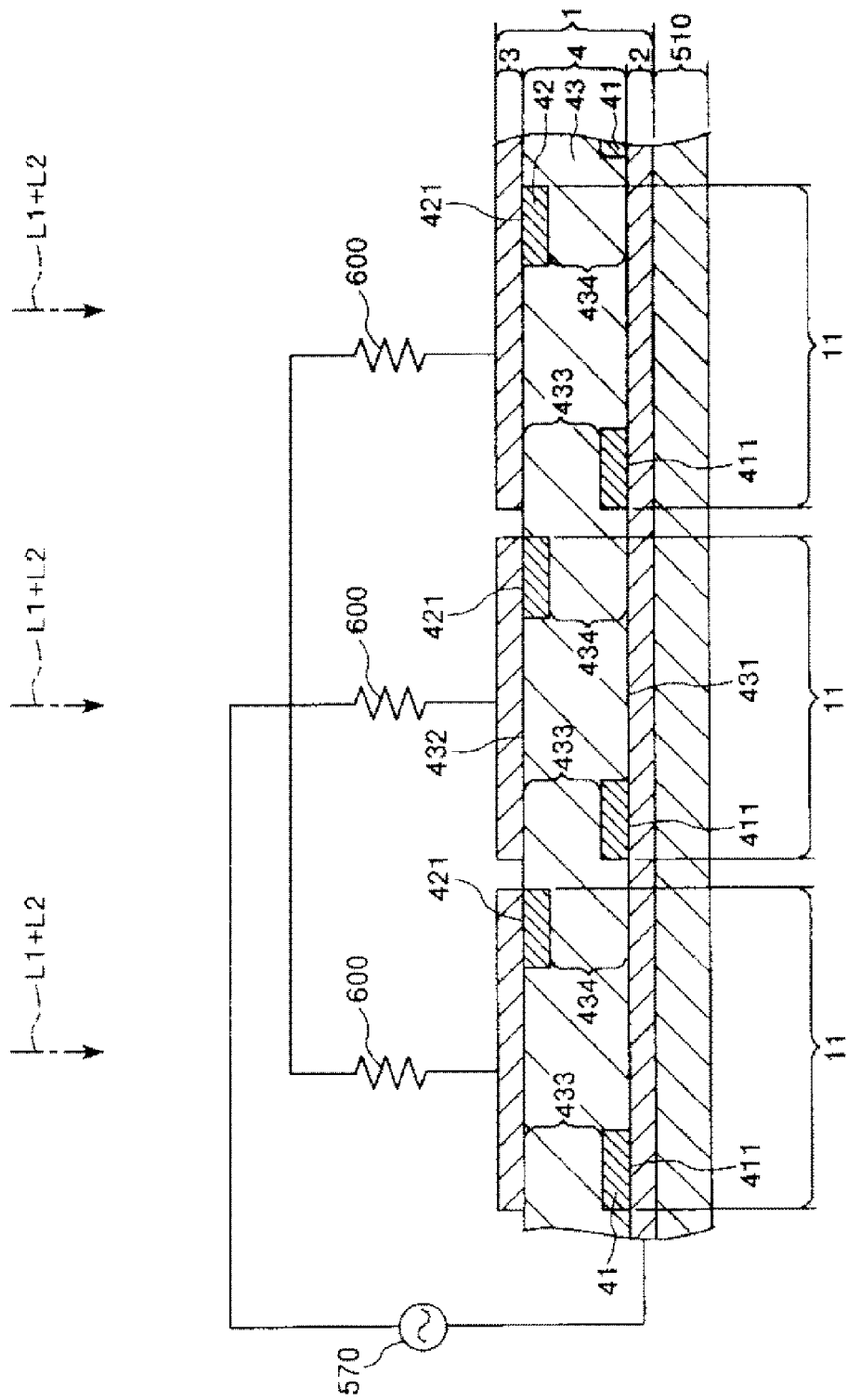
FIG. 7 is a cross-sectional view showing another example of the use of the photoconductive switching element array according to a third embodiment of the invention.

FIG. 7 is a cross-sectional view showing another example (third embodiment) of the use of the photoconductive switching element array according to an embodiment of the invention.

Hereinafter, a photoconductive switching element, a photoconductive switching element array, a display device, and an image forming apparatus according to the third embodiment will be described with reference to the drawings. Differences from the above-described embodiments will be focused upon, and the description of similar matters will not be presented here.

This embodiment is the same as the above-described first embodiment except for the configuration of the photoconductive switching element array on the front side.

As shown in FIG. 7, in this embodiment, the oriented film 530, the liquid crystal polymer composite layer 540, the oriented film 550, and the second common electrode 561, and, the second substrate 560 according to the first embodiment are omitted, and, instead of those components electric elements described as electric resistors 600 are connected to the individual electrodes 3. Each resistor is arranged between the voltage applying unit 570 and the individual electrode 3. Even by employing such a configuration, similarly to the first embodiment, the photoconductive switching element array 1 can be driven in a power saving manner.

Fourth Embodiment

Figure 8:
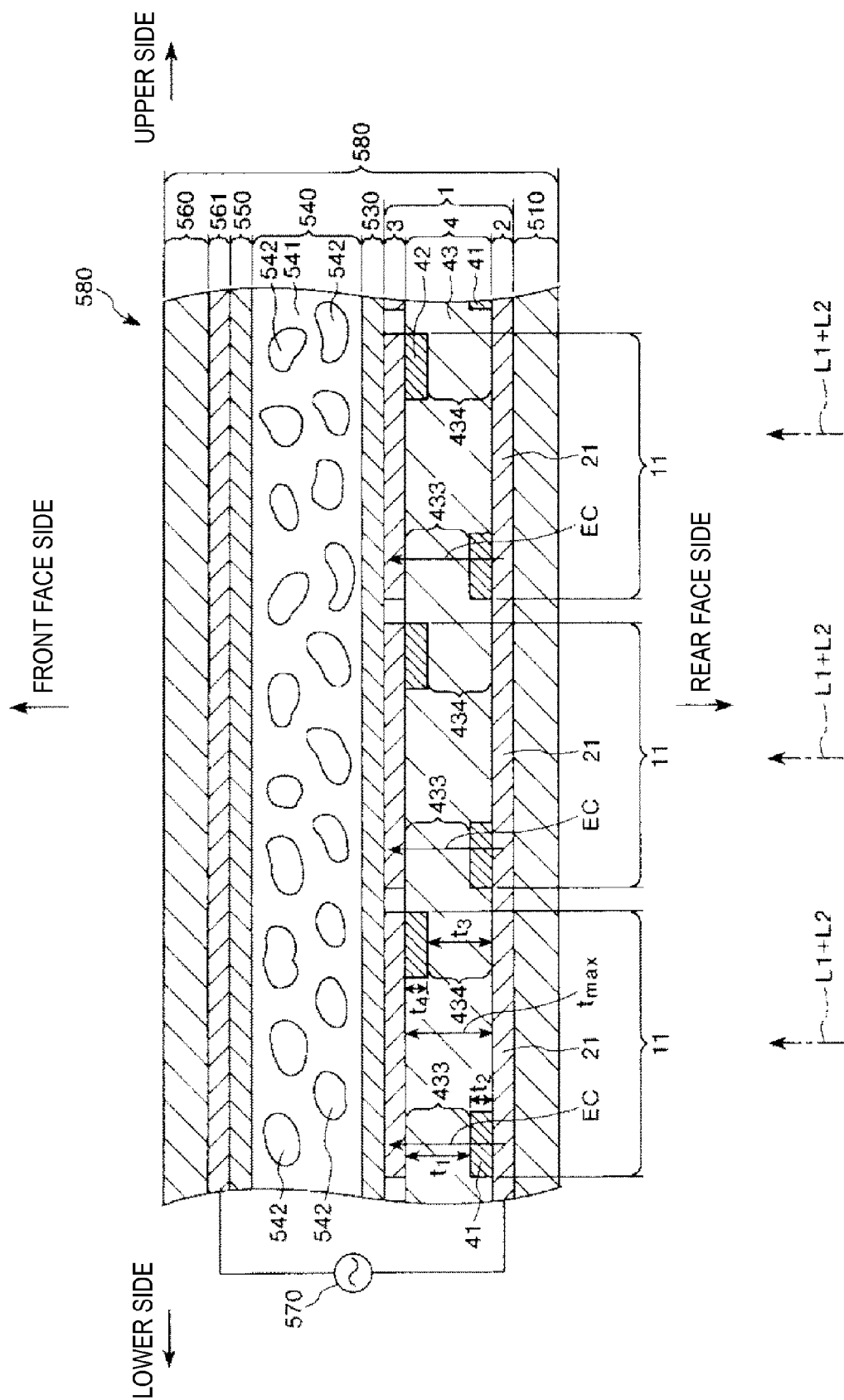
FIG. 8 is a cross-sectional view showing a screen (display device) included in an image forming apparatus according to a fourth embodiment of the invention.

FIG. 8 is a cross-sectional view showing a screen (display device) included in an image forming apparatus according to a fourth embodiment of the invention. In FIG. 8, the left side is the "up" or the "upper side", the right side is the "low" or the "lower side", the upper side is the "front ("front face")" or the "front side", and the lower side is the "rear (rear face)" or the "rear side".

Hereinafter, a photoconductive switching element, a photoconductive switching element array, a display device, and an image forming apparatus according to the fourth embodiment will be described with reference to the drawing. Differences from the above-described embodiments will be focused upon, and the description of similar matters will not be presented here.

This embodiment is the same as the above-described first embodiment except for the reversal of the front side and the rear side of the screen.

As shown in FIG. 8, in the screen 580 according to this embodiment is different from the screen 580 according to the first embodiment, the second substrate 560 side is the front face side, and the first substrate 510 side is the rear face side, and the screen 580 is used while image light L1 or address light L2 is incident from the first substrate 510 side (the photoconductive switching element array 1). As the image light L1 or the address light L2 is incident, each photoconductive switching element 11 can take the first state or the second state, whereby the photoconductive layer 4 can be configured as a low-resistance component without increasing the voltage up to a level exceeding the energy barrier.

As above, the front and rear sides of the screen 580 can be reversed, and, even in such a case, as described also in the first embodiment, the driving voltage for which the transmittance of the screen 580 has a minimum value can be decreased as much as possible. In other words, the screen can be driven in a power saving manner.

As above, although the photoconductive switching elements, the photoconductive switching element arrays, the display devices, and the image forming apparatuses according to the embodiments of the invention have been described, the invention is not limited thereto, and each unit that configures the photoconductive switching elements, the photoconductive switching element arrays, the display devices, and the image forming apparatuses may be replaced with an arbitrary configuration that can show the same function. In addition, an arbitrary component may be further added.

In addition, a photoconductive switching element, a photoconductive switching element array, a display device, and an image forming apparatus according to an embodiment of the invention may be acquired by combining two or more arbitrary configurations (features) of the above-described embodiments.

Furthermore, in each of the above-described embodiments, although the display device has been described as a device including a plurality of photoconductive switching elements arranged in a matrix pattern, the invention is not limited thereto, and a display device according to an embodiment of the invention may include one photoconductive switching element.

In addition, in the display device according to each of the above-described embodiments, the liquid crystal polymer composite layer is in the transmitting state when no voltage is applied. However, the invention is not limited thereto, and thus the liquid crystal polymer composite layer may be in the transmitting state when a voltage is applied, and furthermore, the liquid crystal polymer composite layer may be a general TN-mode liquid crystal layer.

Furthermore, the shape of the individual electrode in the plan view may have a quadrangle such as a rectangle other than the square and may have a round shape such as a circle or an oval.

In addition, as the electric charge generating materials included in the first electric charge generating layer and the second electric charge generating layer, inorganic materials other than the above-described organic materials can be used.

The entire disclosure of Japanese Patent Application No. 2011-085826, filed Apr. 7, 2011 is expressly incorporated by reference herein.

What is claimed is:

1. A photoconductive switching element comprising:
a first electrode;
a second electrode that is arranged so as to face the first electrode; and
a photoconductive layer that is arranged between the first electrode and the second electrode and realizes conductivity by receiving light,
wherein the photoconductive layer includes:
a first electric charge generating layer and a second electric charge generating layer that generate electric charge when light is received; and
an electric charge transport layer which is brought into contact with the first electric charge generating layer and the second electric charge generating layer and to which the electric charge generated by the first electric charge generating layer and the second electric charge generating layer can be moved, and
wherein the first electric charge generating layer and the second electric charge generating layer are arranged at mutually-different positions in a direction perpendicular to a thickness direction of the electric charge transport layer and at mutually-different positions in the thickness direction of the electric charge transport layer.

2. The photoconductive switching element according to claim 1,
wherein the first electric charge generating layer is deviated to the first electrode side, and
wherein the second electric charge generating layer is deviated to the second electrode side.

3. The photoconductive switching element according to claim 2, wherein the first electric charge generating layer is brought into contact with the first electrode, or the second electric charge generating layer is brought into contact with the second electrode.

4. The photoconductive switching element according to claim 2, wherein, when a voltage is applied between the first electrode and the second electrode, a current takes a first state in which the current flows through the first electrode, the first electric charge generating layer, the electric charge transport layer, and the second electrode in this order and a second state in which the current flows through the second electrode, the second electric charge generating layer, the electric charge transport layer, and the first electrode in this order.

5. The photoconductive switching element according to claim 1, wherein an area of each of the first electric charge generating layer and the second electric charge generating layer in a plan view in the thickness direction of the electric charge transport layer is smaller than an area of the electric charge transport layer in the plan view.

6. The photoconductive switching element according to claim 1, wherein a thickness of a portion of the electric charge transport layer in which the first electric charge generating layer is arranged is larger than a thickness of the first electric charge generating layer, and a thickness of a portion of the electric charge transport layer in which the second electric charge generating layer is arranged is larger than a thickness of the second electric charge generating layer.

7. The photoconductive switching element according to claim 1, wherein the first electric charge generating layer and the second electric charge generating layer are arranged so as to be separated from each other in a plan view in the thickness direction of the electric charge transport layer.

8. The photoconductive switching element according to claim 7,
wherein a shape of at least one electrode of the first electrode and the second electrode forms a quadrangle in the plan view, and
wherein the first electric charge generating layer and the second electric charge generating layer are arranged at positions located on a diagonal of the quadrangle in the plan view.

9. The photoconductive switching element according to claim 1, wherein at least one of the first electric charge generating layer and the second electric charge generating layer is embedded in the electric charge transport layer.

10. The photoconductive switching element according to claim 1, wherein the first electrode and the second electrode have optical transparency.

11. A photoconductive switching element array comprising:
a plurality of the photoconductive switching elements according to claim 1,
wherein the plurality of the photoconductive switching elements are arranged in a matrix pattern in an in-plane direction thereof.

12. A photoconductive switching element array comprising:
a plurality of the photoconductive switching elements according to claim 2,
wherein the plurality of the photoconductive switching elements are arranged in a matrix pattern in an in-plane direction thereof.

13. The photoconductive switching element array according to claim 11, wherein at least one type of the first electrodes and the second electrodes are connected to each other or integrally formed.

14. The photoconductive switching element array according to claim 12, wherein at least one type of the first electrodes and the second electrodes are connected to each other or integrally formed.

15. A display device comprising:
the photoconductive switching element array according to claim 11; and
a liquid crystal layer that is arranged on the first electrode side or the second electrode side of the photoconductive switching element that is included in the photoconductive switching element array.

16. A display device comprising:
the photoconductive switching element array according to claim 13; and
a liquid crystal layer that is arranged on the first electrode side or the second electrode side of the photoconductive switching element that is included in the photoconductive switching element array.

17. The display device according to claim 15, wherein the liquid crystal layer can take a light transmitting state in which light is transmitted and a light diffusing state in which light is diffused.

18. The display device according to claim 16, wherein the liquid crystal layer can take a light transmitting state in which light is transmitted and a light diffusing state in which light is diffused.

19. An image forming apparatus comprising:
the display device according to claim 15; and
a projector that draws an image by emitting light to the display device.

20. An image forming apparatus comprising:
the display device according to claim 17; and
a projector that draws an image by emitting light to the display device.

* * * * *